United States Patent [19]

Röhrle

[11] Patent Number: 4,684,862

[45] Date of Patent: Aug. 4, 1987

[54] CONTROL APPARATUS FOR A MULTIPLE-AXIS MACHINE TOOL

[75] Inventor: Josef Röhrle, Hessdorf, Fed. Rep. of Germany

[73] Assignee: Siemens Aktiengesellschaft, Munich, Fed. Rep. of Germany

[21] Appl. No.: 817,030

[22] Filed: Jan. 8, 1986

[30] Foreign Application Priority Data

Jan. 22, 1985 [DE] Fed. Rep. of Germany ....... 3501968

[51] Int. Cl.⁴ .............................................. G05B 19/10
[52] U.S. Cl. ................................. 318/568; 364/133; 364/167; 364/200
[58] Field of Search ...................... 318/567, 568, 569; 364/133, 131, 134, 140, 141, 167, 513, 200, 900, 474; 340/825.06–825.08, 825.27

[56] References Cited

U.S. PATENT DOCUMENTS

| | | |
|---|---|---|
| 4,021,650 | 5/1977 | Ruble ................................. 364/167 |
| 4,084,083 | 4/1978 | McNally ............................. 364/167 |
| 4,123,794 | 10/1978 | Matsumoto ........................ 364/134 |
| 4,149,235 | 4/1979 | Floyd ................................. 364/134 |
| 4,215,398 | 7/1980 | Burkett .............................. 364/134 |
| 4,308,584 | 12/1981 | Arai .................................... 364/5.3 |
| 4,410,944 | 10/1983 | Kronies .............................. 364/134 |
| 4,467,436 | 8/1984 | Chance ............................... 364/200 |
| 4,490,660 | 12/1984 | Tsuchihashi ................... 318/568 D |
| 4,571,694 | 2/1986 | Inaba .............................. 318/568 D |
| 4,578,764 | 3/1986 | Hutchins ............................ 364/131 |
| 4,580,207 | 4/1986 | Arai .................................... 364/131 |
| 4,591,977 | 5/1986 | Nissen ................................ 364/133 |
| 4,604,561 | 8/1986 | Kamajima .......................... 318/567 |

FOREIGN PATENT DOCUMENTS 0055782 7/1982 European Pat. Off. .

OTHER PUBLICATIONS

Harald Walze, "Modulare Maschinensteuerung bietet breites Anwendungsspektrum", Eletronik, 1984, pp. 117–122.

Primary Examiner—William M. Shoop, Jr.
Assistant Examiner—Patrick C. Keane
Attorney, Agent, or Firm—Kenyon & Kenyon

[57] ABSTRACT

An apparatus for controlling the motion of machine tool components about or along respective axes comprises a plurality of structurally identical processors each capable of controlling one complex motion or a plurality of simple motions. Each processor receives desired position values from a numerical control unit and has access to a first memory storing actual position values and a second memory storing desired rates of motion generated by the processors.

18 Claims, 1 Drawing Figure

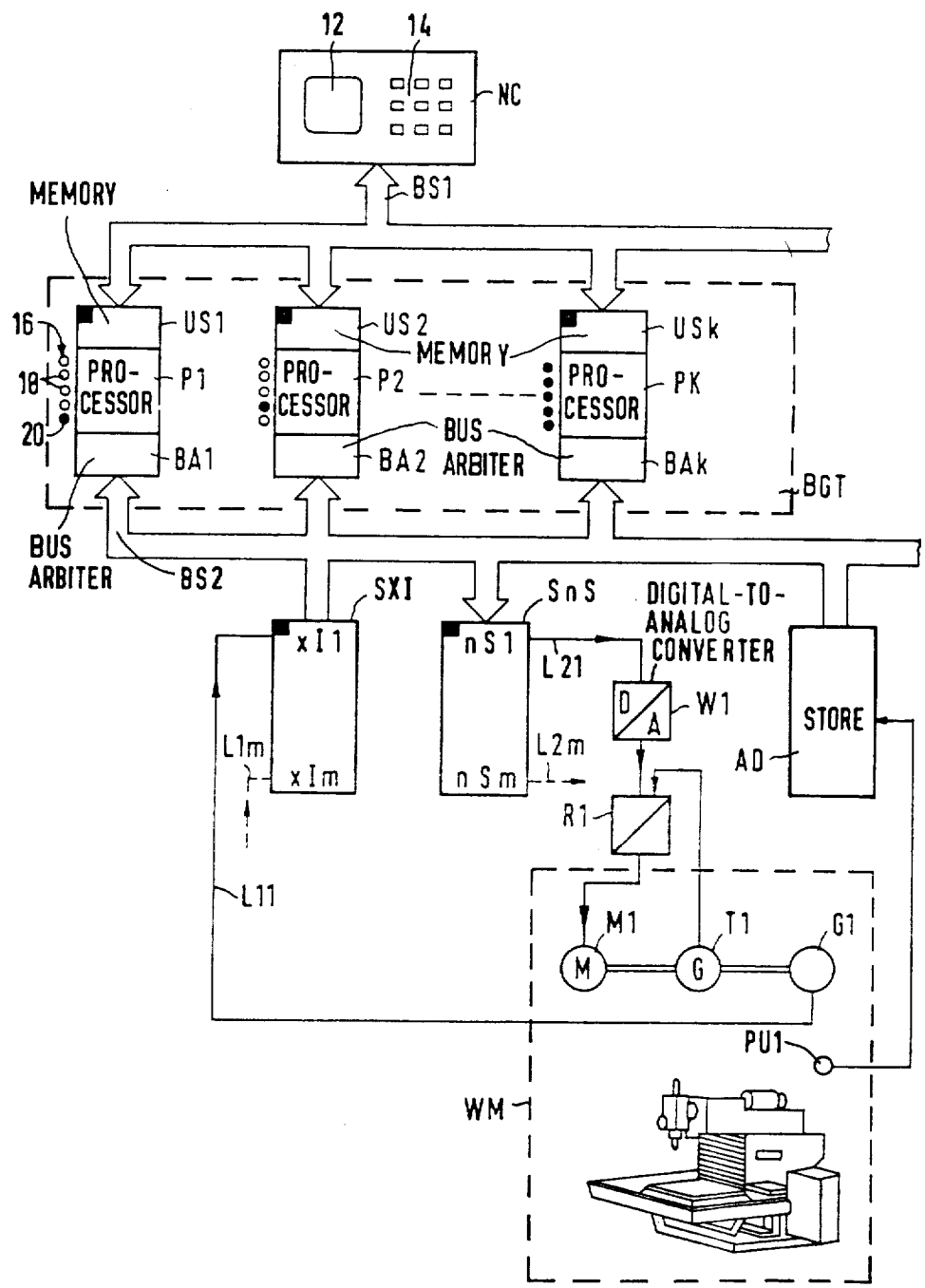

CONTROL APPARATUS FOR A MULTIPLE-AXIS MACHINE TOOL

BACKGROUND OF THE INVENTION

This invention relates to a control apparatus for a multiple-axis machine tool having a plurality of movable components each shiftable by a respective linear drive along a respective translation axis or rotatable by a respective rotary drive about a respective rotation axis. The control apparatus functions to control the motion of the machine tool components along the translation axes and about the rotation axes.

In a control apparatus of conventional type, the motions of the machine tool parts are controlled in accordance with predetermined programs corresponding to the various movable machine tool parts. The actual position or orientation of a movable machine tool component with respect to a particular axis is determined by a position setting device associated with that axis. The desired position or orientation of a machine tool component and the actual position or orientation thereof with respect to a particular axis are fed to at least one position controller which generates a control signal encoding the value of a desired rate of translation or rotation, this control signal being transmitted to the drive associated with the respective axis.

With the increasing degree of automation, modern machine tools have an increasingly larger number of axes along which or about which machine tool components move. For example, modern lathes are equiped with two independent slides. In addition, the movement of the headstock and the loading and unloading of the machine may be controlled by the machine tool control apparatus.

To ensure accurate positioning of each movable machine tool component with respect to its associated axis or axes, the control apparatus of the above-mentioned type is designed so that the actual positions of the particular machine tool component relative to its axes are controlled with respect to associated predetermined reference positions. The controlling functions are executed by a common position controller. Inasmuch as, depending on the application, different dynamic behaviors are required of such a position controller (a simple milling or drilling machine is adequately controlled with a position control cycle of 8–10 msec, while a highly dynamic lathe requires cycle times of approximately 1–4 msec) the design of the position controller must frequently be adapted to the particular application.

An object of the present invention is to provide an improved machine tool control apparatus of the above-described type.

Another, more particular, object of the present invention is to provide such a control apparatus which is easily and simply adaptable to different technical applications.

SUMMARY OF THE INVENTION

The present invention is directed to a control apparatus for a multiple-axis machine tool having a plurality of movable components each shiftable by a respective linear drive along a respective translation axis or rotatable by a respective rotary drive about a respective rotation axis. The control apparatus comprises, in accordance with the present invention, a numerical controller for supplying, in accordance with predetermined parts programs, electrically encoded reference positions for the movable components along the translation axes and about the rotation axes. A plurality of transfer memories are operatively connected to the numerical controller for receiving therefrom and temporarily memorizing the electrically encoded reference positions. Pick-ups are provided for sensing actual positions of the movable components along the translation axes and about the rotation axes and for generating electrical signals encoding the sensed actual positions. An electronic storage device is operatively connected to the pick-ups for receiving therefrom and temporarily storing the electrical signals generated thereby.

A position controller is operatively connectable to the numerical controller via the transfer memories and to the storage device for generating control signals for modifying the rates of linear motion of the movable machine tool components along the translation axes and for modifying the rates of rotation of the components about the rotation axes. The position controller generates the control signals in response to the reference positions received from the numerical controller via the transfer memories, in response to the actual positions encoded in the electrical signals generated by the pick-ups, and in accordance with predetermined motion parameters. The position controller includes a plurality of substantially similar processors, while the transfer memories are equal in number to the processors and operatively connected to respective ones thereof.

Coupling means are provided in the control apparatus for operatively connecting to the numerical controller and to the storage device a number of processors equal at most to the total number of the translation axes and the rotation axes. The number of processors connected by the coupling means is detectable by the numerical controller and communicatable thereby to the connected processors. The store is accessible in its entirety by each of the connected processors. The predetermined motion parameters used by the position controller for generating the control signals may be transmitted from the numerical controller to the various processors.

In a control apparatus in accordance with the present invention, the position control processors all have substantially the same structure. In this way, each processor may be designed for controlling dynamic motion of a component along or about a single axis. If the control requirements for motion along or about a plurality of axes are less than or approximately equal to the requirements for controlling a dynamic motion, at least one of the processors may be assigned a plurality of jobs, i.e., may control motion along or about a plurality of axes.

In accordance with another feature of the present invention, the coupling means includes a module carrier provided with a plurality of connection stations, e.g., in the form of respective plug-in locations. The coupling means further includes structure for designating the connected processors with respective type codes communicated to the numerical controller in response to poling signals therefrom during an initialization phase of the operation of the numerical controller. The numerical controller supplies to the processors address codes for traffic control.

The modular position control arrangement in accordance with the present invention results in a simple circuit realization, the plug-in locations being equiped by a user depending on the requirements for the particular machine tool. The provision of connection stations or plug-in locations for individual position control processors maximizes the versatility of the control apparatus.

Pursuant to further features of the present invention, a central bus system connects the numerical controller to the transfer memories, while a plurality of bus arbiters, associated with respective processors, and a local bus system connects the processors to the storage device. This structure has the advantages of facilitating data reading and transmission.

In accordance with yet another feature of the present invention, the pick-ups continuously deliver electrical signals to the storage device, whereby the encoded actual positions of the movable machine components are continuously updated therein and whereby the transmission of the actual position signals is independent of the data transmission path between the numerical controller and the processors. In addition, the control signals, encoding desired rates of motion of the movable machine tool components along the translation axes and about the rotation axes, may be transmitted continuously from the storage device to the linear drives and rotary drives of the machine tool. This structure results in a decoupling of the data traffic between the storage device and the processors.

If, in addition, to the position control processors and the associated drives, setting devices for the actual motions of the movable machine tool components are provided, it is possible to connect a speed controller, e.g., a plurality of separate speed control processors, between the position control processors and the linear drives and the rotary drives, whereby a position control optimized in time may be realized.

Pursuant to a particular feature of the present invention, additional pick-ups may be provided for sensing actual rates of motion of the movable components of the machine tool along the translation axes and about the rotation axes and for generating additional electrical signals encoding the sensed actual rates of motion. The storage device may be operatively connected to the additional pick-ups for receiving therefrom and temporarily storing the additional electrical signals. The position controller generates the control signal in response to the actual rates of rotation encoded in the additional electrical signals as well as in response to the reference positions received from the numerical controller via the transfer memories, in response to the encoded actual positions of the movable machine tool components and in accordance with the predetermined motion parameters.

In the case that encoded actual rates of motion of the machine tool components are transmitted to the storage device, the processors for the position control have access to those encoded motion values, as well as to the electrically encoded substantially instantaneous position values. This feature can be of importance, for example, if motions are executed which are correlated along or about a plurality of different axes, such as the spindle axis in a lathe.

Pursuant to a particular feature of the invention, the storage device includes a first memory portion for storing the electrical signals coding the actual positions of the movable machine tool components. A second memory portion stores the actual rates of motion of the movable machine tool components, while a third memory portion stores the control signals from the processors. This feature of the invention can be of advantage if the position control processors also function as speed controllers.

BRIEF DESCRIPTION OF THE DRAWING

The sole Figure of the drawing is a schematic block diagram illustrating a control apparatus in accordance with the invention.

DETAILED DESCRIPTION

As illustrated in the drawing, a numerical control unit NC having a picture screen 12 and a keyboard 14 is connected via a central bus system BS1 to a plurality of transfer memories US1, US2. . . USk. Transfer memories US1, US2. .. USk are in turn connected to respective position control processors P1, P2. . . Pk. The processors are arranged in a module carrier BGT. Each processor P1, P2. . . Pk is coupled to a respective bus arbiter BA1, BA2. . . BAk which functions to connect the respective processor to a local bus system BS2.

Processors P1, P2. . . Pk are coupled to bus system BS1 and BS2 at respective connection stations or plug-in locations in module carrier BGT. Each processor P1, P2. . . Pk is assigned a plug-in location code as indicated in the drawing by coding keys 16 disposed laterally adjacent to each of the processors P1, P2. . . Pk. Coding keys 16 are represented in the drawing by five circles open or filled-in depending on the particular coding. Open circles 18 correspond, for example, to a low logic level, i.e., to a logic level of "0," while filled-in circles 20 correspond to a high logic level ("1"). The plug-in location code assigned to a processor P1, P2. . . Pk is fed to the respective processor via five lines (not illustrated). During an initialization phase in the operation of the control apparatus, the plug-in location codes are transmitted to the numerical control unit NC from processors P1, P2. . . Pk in response to poling signals generated by the numerical control unit.

To local bus system BS2 are connected a first memory or storage unit SXI and a second memory or storage unit SnS. Memory SXI stores electrical signals coding the actual positions xI1-xIm of movable machine tool components with respect to translation axes and rotation axes. Memory SnS stores control signals generated by and transmitted from processors P1, P2. . . PK for modifying rates of linear motion of the machine tool components along translation axes and for modifying rates of rotation of machine tool components about rotation axes. The control signal code desired rates of motion nS1-nSm of the movable machine tool components along the translation axes or about the rotation axes.

The control apparatus illustrated in the drawing, namely, numerical control unit NC, processors P1, P2. . . Pk and storage means SXI and SnS, controls the motion of movable components of a machine tool WM with respect to a total of m axes by ensuring that the actual positions xI1-xIm of the machine tool components are substantially the same as predetermined desired or referenced positions electrically encoded in signals generated by and transmitted from numerical control unit NC to processors P1, P2. . . Pk via memories US1, US2. . . USk and central bus system BS1.

Processors P1, P2. . . Pk all have identical or substantially identical structures and are each capable of controlling a linear or rotary positioning of a machine tool component which executes a dynamic motion. Each processor P1, P2. . . Pk may be assigned an axis associated with a dynamic motion or, alternatively, may be assigned to a plurality of axes along which or about which axes machine tool component execute simple motions. As a specific example, m-axis machine tool WM has k−1 axes each associated with a dynamic motion such that a separate processor for position control is required for each of those axes, while motion with respect to the other axes may be controlled in serial fashion by a single processor. Accordingly, a user will equip module carrier BGT with k position control processor P1, P2. . . Pk, each processor being assigned a respective electrically encoded type code from the beginning of operations.

Upon receiving from processors P1-Pk their respective type codes, numerical control unit NC communicates to each processor P1-Pk a respective address relevant for further data traffic. This address enables the respective processor P1-Pk to select from all of the electrically encoded reference positions generated by numerical control unit NC on central bus system BS1 the electrically encoded reference positions for the particular motion controlled that processor. Numerical control unit NC also communicates to each processor P1-Pk electrically encoded predetermined motion parameters used by the processor in matching the actual position of a machine tool component to the reference position supplied by numerical control unit NC. These motion parameters determine in part the desired rates of motion encoded in the control signals produced by processors P1-Pk.

A linear drive is provided for each translation axis, while a rotary drive is provided for each rotation axis of machine tool WM. However, in the drawing only one motor M1 is illustrated for purposes of clarity. Connected to motor M1 is a tachometer device T1 and a distance pulse transmitter G1. Each motor has a respective tachometer and a respective distance pulse transmitter. The distance pulse transmitters, e.g., transmitter G1, is connected to storage unit SXI for transmitting thereto electrical signals coding the actual position of a machine tool component along or about a respective axis. Accordingly, storage unit SXI has inputs connected to m lead lines L11-L1m extending from the m pulse transmitters operatively connected to machine tool WM.

Each of the pulse transmitters, including pulse transmitter or sensor G1, advantageously continuously transmits to storage unit SXI electrical signals encoding the actual positions of the machine tool components with respect to the translation and rotation axes. Thus, storage unit or memory SXI stores substantially instantaneous actual position values.

Each processor P1-Pk has access to the full memory content of memory SXI via associated bus arbiters BA1-BAk and local bus system BS2. In response to electrically encoded reference positions received from numerical control unit NC via transfer memories US-1-USk, in response to the actual positions encoded in the electrical signals stored in storage unit SXI and in accordance with predetermined motion parameters transmitted from numerical control unit NC, processors P1-Pk generate the control signals xnS1-nSm coding the desired rates of motion of the various machine tool components.

In some cases, it is possible for the actual position signals to be fed directly to the respective processors P1-Pk, depending on such factors as the nature of the motion being controlled (e.g., whether dynamic or simple), the magnitude of the desired or reference speed encoded in the control signals and the number of motions being controlled by each particular processor.

As illustrated in the drawing, memory or storage unit SnS has a plurality of output leads L21-L2m extending to respective digital-to-analog converters of which only one converter W1 is shown for purposes of clarity. The analog values of the desired speeds are transmitted from the digital-to-analog converters to respective speed controllers of which only one controller R1 is shown. The speed controllers are connected to the respective tachometer devices, whereby the speed controllers compare the desired speeds, received from memory or storage unit SnS via the digital-to-analog converters with the actual speeds measured by the tachometer devices. For example, speed controller R1 compares the desired speed or rate of motion with the actual speed from tachometer device T1 and generates a control signal transmitted to motor M1 for modifying the rate of rotation thereof to concomitantly alter the linear or rotary motion of the particular machine tool component associated with motor M1, tachometer device T1, speed controller R1 and digital-to-analog converter W1.

Central bus system BS1 can also communicate, within the scope of possible data transmission capacity, with other units associated with numerical control unit NC, and, similarly, local bus system BS2 can be connected, for example, directly to pick-ups or sensor devices such as pulse transmitter G1.

As shown in the drawing, the control apparatus in accordance with the invention may be provided with an additional memory or storage unit AD operatively connected to a plurality of pick-up devices or sensors, e.g. pick-up device PU1, and to processors P1-Pk via local bus system BS2 and bus arbiters BA1-BAk. The pick-up devices to which memory or storage unit AD is connected serve to sense actual rates of motion of the movable components of machine tool WM and for generating electrical signal and coding the sensed actual rates of motion. These pick-up devices transmit the electrical signals to storage unit AD, wherein the signals are temporarily stored. Processors P1-Pk have access to all the memory locations within storage unit AD and may use the actual-rate values in that memory for generating the control signals transmitted to memory SnS.

Although the invention as been described in terms of particular embodiments and applications, one of ordinary skill in the art, in light of this teaching, can generate additional embodiments and modifications without departing from the spirit of or exceeding the scope of the claimed invention. Accordingly, it is to be understood that the illustrations and descriptions herein are proffered by way of example to facilitate comprehension of the invention and should not be construed to limit the scope thereof.

What is claimed is:

1. A control apparatus for a multi-axis machine tool having a plurality of movable components each shiftable by a respective linear drive along a respective translation axis or rotatable by a respective rotary drive about a respective rotation axis, said control apparatus comprising:
   numerical control means for supplying, in accordance with predetermined parts programs, electrically encoded reference positions for the movable components along the translation axes and about the rotation axes;

memory means, including a plurality of transfer memories operatively connected to said numerical control means, for receiving therefrom and temporarily memorizing said electrically encoded reference positions;

pick-up means for sensing actual positions of the movable components along the translation axes and about the rotation axes and for generating electrical signals encoding the sensed actual positions;

storage means operatively connected to said pick-up means for receiving therefrom and temporarily storing said electrical signals;

position control means operatively connectable to said numerical control means via said memory means and to said storage means for generating, in response to said reference positions received from said numerical control means via said memory means, in response to the actual positions encoded in said electrical signals and in accordance with predetermined motion parameters, control signals for modifying rates of linear motion of said components along said translation axes and rates of rotation of said components about said rotation axes, said position control means including a plurality of substantially similar processors, said transfer memories being equal in number to said processors and operatively connected to respective ones thereof; and coupling means for operatively connecting to said numerical control means and to said storage means a variable number of said processors equal at most to the total number of said translation axes and said rotation axes and for enabling detection by said numerical control means of the number of processors connected by said coupling means and for further enabling communication, to each one of the connected processors by said numerical control means, of the identity of each of said components and said axes to be controlled by said one of the connected processors, said storage means being accessible in its entirety by each of the connected processors.

2. A control apparatus according to claim 1 wherein said coupling means includes a module carrier provided with a plurality of connection stations and further includes means for designating said connected processors with respective type codes communicated to said numerical control means in response to poling signals therefrom during an initialization phase of the operation of said numerical control means, said numerical control means supplying to said processors address codes for traffic control.

3. A control apparatus according to claim 2, further comprising means including a central bus system for connecting said numerical control means to said memory means.

4. A control apparatus according to claim 3, further comprising means, including a plurality of bus arbiters associated with respective ones of said processors and a local bus system, for connecting said processors to said storage means.

5. A control apparatus according to claim 4 wherein said pick-up means continuously delivers said electrical signals to said storage means, whereby the encoded actual positions of the movable machine components are continuously updated in said storage means.

6. A control apparatus according to claim 5 wherein said control signals are transmitted from said processors to said storage means and temporarily stored therein, said storage means continuously delivering said control signals to the linear drives and the rotary drives.

7. A control apparatus according to claim 6, further comprising means, including a plurality of speed control devices each operatively connected between said storage means and a respective one of the linear drives and the rotary drives, for controlling the operation of the respective drives in response to said control signals, said control signals being continuously transmitted from said storage means to said speed control devices.

8. A control apparatus according to claim 1, further comprising means including a central bus system for connecting said numerical control means to said memory means.

9. A control apparatus according to claim 1, further comprising means, including a plurality of bus arbiters associated with respective ones of said processors and a local bus system, for connecting said processors to said storage means.

10. A control apparatus according to claim 1 wherein said pick-up means continuously delivers said electrical signals to said storage means, whereby the encoded actual positions of the movable machine components are continuously updated in said storage means.

11. A control apparatus according to claim 1 wherein said control signals are transmitted from said processors to said storage means and temporarily stored therein, said storage means continuously delivering said control signals to the linear drives and the rotary drives.

12. A control apparatus according to claim 1, further comprising means, including a plurality of speed control devices each operatively connected between said position control means and a respective one of the linear drives and the rotary drives, for controlling the operation of the respective drives in response to said control signals.

13. A control apparatus according to claim 12 wherein said speed control devices are connected to said storage means and wherein said control signals are transmitted from said processors to said storage means and temporarily stored therein, said storage means continuously delivering said control signals to said speed control devices.

14. In a control apparatus of a multiaxis machine tool having a plurality of movable components each shiftable by a respective linear drive along a respective translation axis or rotatable by a respective rotary drive about a respective rotation axis, said control apparatus including numerical control means for supplying, in accordance with predetermined parts programs, electrically encoded reference positions for the movable components along the translation axes and about the rotation axes, said control apparatus also including pick-up means for sensing actual positions of the movable components along the translation axes and about the rotation axes and for generating electrical signals encoding the sensed actual positions, said control apparatus further incuding position control means operatively connectable to said numerical control means for generating control signals for modifying rates of linear motion of said components along said translation axes and rates of rotation of said components about said rotation axes, the improvement comprising:

(a) memory means, including a plurality of transfer memories operativley connected to the numerical control means, for receiving therefrom and temporarily memorizing the electrically encoded reference positions;

(b) storage means operatively connected to the pick-up means for receiving therefrom and temporarily storing the electrical signals encoding the actual positions of the movable machine tool components, the position control means being operatively connectable to said numerical control means via said memory means and to said storage means for generating the control signals in response to said reference positions, in response to the actual positions encoded in said electrical signals and in accordance with predetermined motion parameters;

(c) a plurality of substantially similar processors included in said position control means, said transfer memories being equal in number to said processors and operatively connected to respective ones thereof; and (d) coupling means for operatively connecting to said numerical control means and to said storage means a variable number of said processors equal at most to the total number of said translation axes and said rotation axes and for enabling detection by said numerical control means of the number of processors connected by said coupling means and for further enabling communication, to each one of the connected processors by said numerical control means, of the identity of each of said components and said axes to be controlled by said one of the connected processors, said storage means being accessible in its entirety by each of the connected processors.

15. A control apparatus according to claim 14, wherein said coupling means includes a module carrier provided with a plurality of connection stations and further includes means for designating said connected processors with respective type codes communicated to said numerical control means in response to poling signals therefrom during an initialization phase of the operation of said numerical control means, said numerical control means supplying to said processors address codes for traffic control.

16. A control apparatus for a multi-axis machine tool having a plurality of movable components each shiftable by a respective linear drive along a respective translation axis or rotatable by a respective rotary drive about a respective rotation axis, said control apparatus comprising:

numerical control means for supplying, in accordance with predetermined parts programs, electrically encoded reference positions for the movable components along the translation axes and about the rotation axes;

memory means, including a plurality of transfer memories operatively connected to said numerical control means, for receiving therefrom and temporarily memorizing said electrically encoded reference positions;

pick-up means for sensing actual positions of the movable components along the translation axes and about the rotation axes and for generating electrical signals encoding the sensed actual positions;

storage means operatively connected to said pick-up means for receiving therefrom and temporarily storing said electrical signals;

position control means operatively connectable to said numerical control means via said memory means and to said storage means for generating, in response to said reference positions received from said numerical control means via said memory means, in response to the actual positions encoded in said electrical signals and in accordance with predetermined motion parameters, control signals for modifying rates of linear motion of said components along said translation axes and rates of rotation of said components about said rotation axes, said position control means including a plurality of substantially similar processors, said transfer memories being equal in number to said processors and operatively connected to respective ones thereof;

first coupling means including a central bus system for operatively connecting to said numerical control means a variable number of said processors equal at most to the total number of said translation axes and said rotation axes and for enabling detection by said numerical control means of the number of processors connected by said coupling means and for further enabling communication, to each one of the connected processors by said numerical control means, of the identity of each of said components and said axes to be controlled by said one of the connected processors;

second coupling means including a local bus system for enabling access by each one of the connected processors to all of said storage means, said second coupling means further including a plurality of bus arbiters at least equal in number to the connected processors for controlling access of the connected processors to said local bus system;

third coupling means including a separate line system for operatively linking said pick-up means to said storage means to enable continuous supply of said electrical signals from said pick-up means to said storage means independently of said local bus system; and fourth coupling means including another separate line system for operatively connecting said position control means to drives for said components to enable continuous supply of said control signals from said position control means to said drives independently of said central bus system and said local bus system.

17. A control apparatus according to claim 16, further comprising a module carrier having plug-in stations equal to the total number of said processors, each of the connected processors being mounted to said module carrier at a respective one of said plug-in stations, each of the connected processors having an associated type code transmitted to said numerical control means via said first coupling means during an initialization phase and in response to a polling signal from said numerical control means, said numerical control means being adapted to transmit to each of the connected processors an address code for facilitating data traffic.

18. A control apparatus according to claim 16, further comprising means including speed controllers connected between said position control means and said drives for setting speeds of said drives and concomitantly of said components.

* * * * *